May 24, 1966 G. R. SCOTT 3,252,672
WHEEL WINCH
Filed Aug. 24, 1964 2 Sheets-Sheet 1
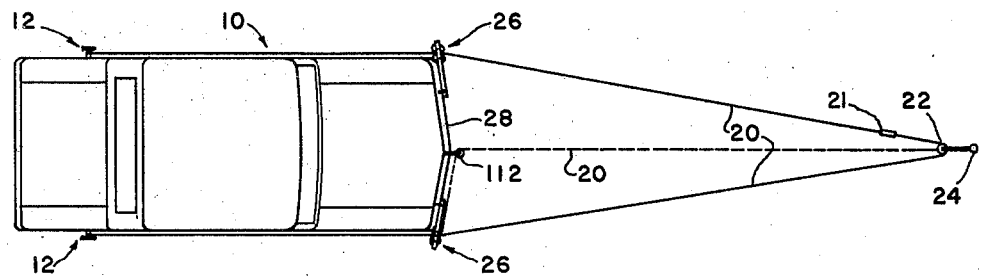
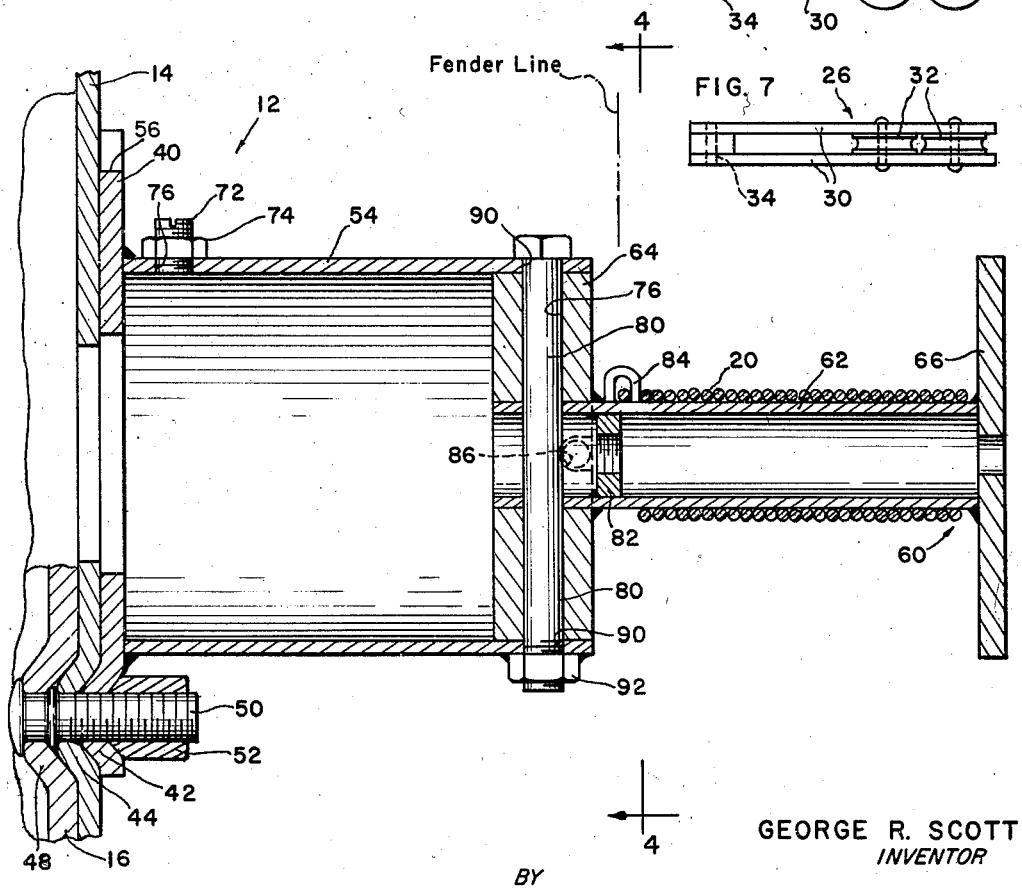
GEORGE R. SCOTT
INVENTOR
BY
BUCKHORN, BLORE, KLARQUIST & SPARKMAN
ATTORNEYS May 24, 1966  G. R. SCOTT  3,252,672
WHEEL WINCH
Filed Aug. 24, 1964 2 Sheets-Sheet 2
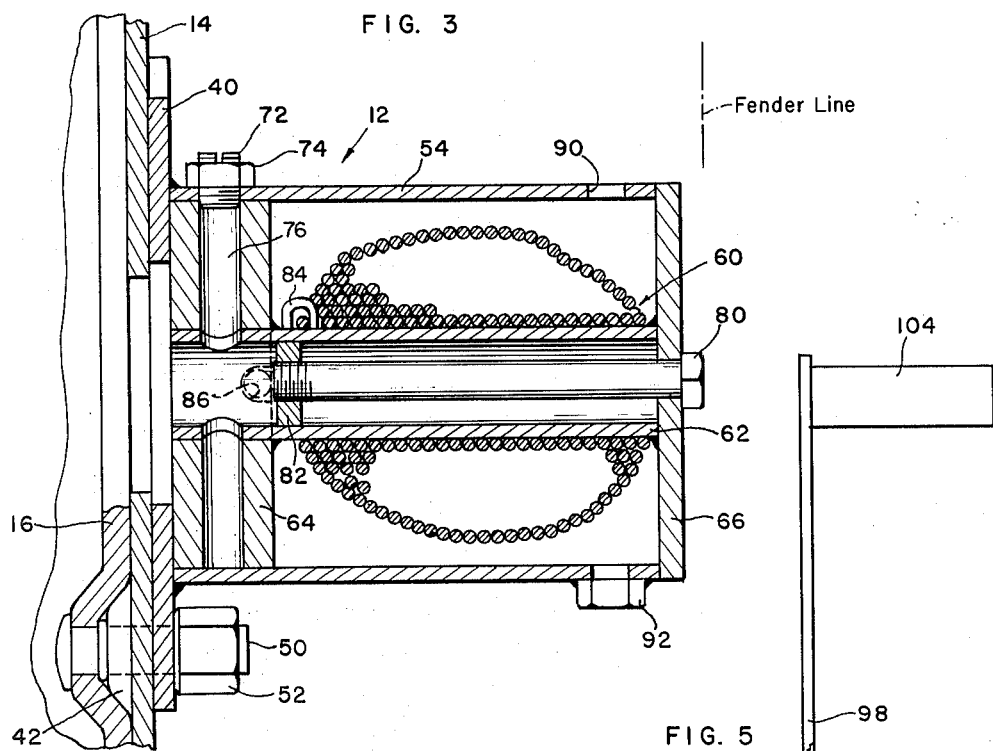
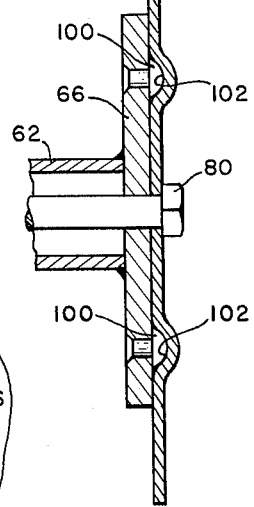
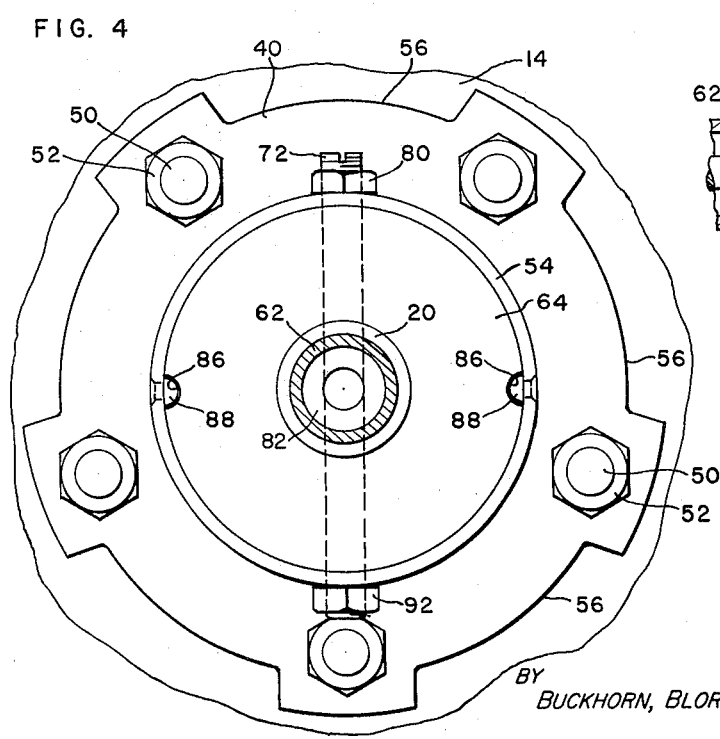
GEORGE R. SCOTT
INVENTOR
BY BUCKHORN, BLORE, KLARQUIST & SPARKMAN
ATTORNEYS

United States Patent Office 3,252,672
Patented May 24, 1966

3,252,672
WHEEL WINCH
George R. Scott, 3340 Scott Ave., Albany, Oreg.
Filed Aug. 24, 1964, Ser. No. 391,626
10 Claims. (Cl. 242—95)

This invention relates to a wheel winch, and more particularly to an extensible winch for a vehicle.

Some winches known hitherto which are adapted to be secured to wheels of vehicles have been unsatisfactory because they are so large in drum diameter that, in operation, overloads on the transmission structures of the vehicles occur. They also have had to be sufficiently long for cables therefrom to clear the fenders and sides of the vehicles, which, while causing no difficulty during operation of the winches, creates a serious hazard when the vehicles are driven on roads, particularly where the roads are narrow or have occasional posts or obstacles along the sides thereof which the winches can engage. It would be desirable to have a winch which is extensible from a storage position inside the fender line of the vehicle to which it is secured to an operating position extending beyond the fender line of the vehicle.

An object of the invention is to provide a new and improved wheel winch.

Another object of the invention is to provide an extensible winch for a vehicle.

A further object of the invention is to provide a winch for a vehicle having a drum portion extensible from a position enclosed in a tubular housing fastened to the wheel of a vehicle, with the drum keyed to and driven by the housing.

Yet another object of the invention is to provide a wheel winch having a driving housing normally enclosing a cable takeup drum and adapted to have the drum moved from the interior thereof to a position extending from one end of the housing and keyed thereto.

A still further object of the invention is to provide a wheel winch having a drum selectively keyed to and releasable from a connecting member secured to a vehicle wheel so that the drum may be driven while keyed to the wheel or may be rotated manually relative to the wheel when not keyed to the wheel to make up the cable.

A wheel winch illustrating certain features of the invention includes a housing securable to a vehicle wheel and a drum extensible from a storage position enclosed in the housing to an operative position extending from one end of the housing and keyed thereto. Preferably the drum is provided with a handle on the outer end of the drum and is releasable from the housing to permit manual rotation of the drum relative to the vehicle wheel to wind the cable on the drum.

A complete understanding of the invention may be obtained from the following detailed description of a wheel winch forming a specific embodiment thereof, when read in conjunction with the appended drawings, in which:

FIG. 1 is a schematic, top plan view of a vehicle having mounted thereon wheel winches;

FIG. 2 is an enlarged, fragmentary, vertical sectional view of one of the winches of FIG. 1 shown in an extended, operative condition;

FIG. 3 is an enlarged, fragmentary, vertical sectional view of the winch of FIG. 2 while in the storage condition thereof;

FIG. 4 is an enlarged vertical sectional view taken along line 4—4 of FIG. 2;

FIG. 5 is an enlarged, fragmentary, vertical sectional view of the winch of FIG. 2; and FIGS. 6 and 7 are, respectively, enlarged top plan and front elevation views of a fairlead used with the winch of FIG. 2.

Referring now in detail to the drawings, a vehicle or automobile 10 (FIG. 1) is shown with two wheel winches 12 secured to the rear wheels 14 (FIG. 2) and brake drums 16 of the vehicle and rotated with the wheels to take up tow cables or ropes 20 (FIG. 1) secured together by coupling 21 near a snatch block 22 and extending through the snatch block. The snatch block is temporarily fastened to an anchor 24 such as, for example, a post or stump. The cables extend through fairleads 26 fastened to bumper 28 of the vehicle, each fairlead having a block portion 30 (FIGS. 6 and 7) and opposed, grooved pulleys 32 and being secured to the bumper or bumper mounting structure by a bolt (not shown) projecting through hole 34 in the block portion 30.

As illustrated best in FIG. 2, each wheel winch 12 includes a scalloped, annular disc 40 having formed, frustoconical portions 42 fitting into contemporary frustoconical portions 44 of the wheel 14 of the vehicle. The disc 40 is fastened tightly to the wheel, and the portions 44 fit into complementary frustoconical socket portions 48 of the brake drum 16 which drives the wheel. The disc 40, wheel 14 and brake drum 16 are secured together by lug bolts or studs 50 and nuts 52. The disc 40 forms a flanged end for a tubular housing 54, and has peripheral notches or scollops 56 to provide clearance for projections (not shown) present on many types of automobile wheels for securing hub caps to the wheels.

A drum or reel 60 has a tubular shaft or drum portion 62 of small diameter to the ends of which are secured integrally therewith discs or flanges 64 and 66. The drum is movable between a storage position shown in FIG. 3 in which the cable 20 is completely enclosed within the housing 54 and an extended operative position shown in FIG. 2 in which the portion of the shaft 62 carrying the cable thereon extends completely beyond the housing. When the winch is in its storage position shown in FIG. 3, the winch is completely within the fender line of the vehicle. A set screw 72 is threaded through a nut 74 fixed to the housing and extends into transverse bore 76 in the flange 64 to hold the reel 60 in the housing and prevent rotation of the reel relative to the housing. In this storage condition, a locking bolt or pin 80 is threaded into a nut 82 fixed in the hollow shaft 62. The inner end of the cable 20 is secured to a fastener 84 (FIG. 2) fixed to the shaft 62.

To place the winch 10 in operative position, the bolt 80 is withdrawn from the storage position thereof in the reel 60, and then the set screw 72 is withdrawn from the bore 76 in the inner disc 64 of the reel. The reel then is pulled out of the housing until keying notches 86 in the outer face and peripheral portion of the disc move over the heads of rivets 88 fixed to the interior of the housing 54 and forming keys and stops. At this time, the bore 76 is aligned with holes 90 in the housing and the bolt 80 is placed in the holes 90 and bore 76 and is threaded into nut 92 brazed to the housing 54. The bolt 80 and rivets 88 keyed the reel 60 to the housing so that, when the wheel 14 is rotated, the housing is rotated thereby and rotates the reel to take up the cable 20.

To reel the cable back up onto the reel 60 after use of the winch, the bolt 80 is withdrawn from the bores 76 and 90 and the reel is pushed slightly into the housing to move the notches 86 off the rivet heads 88. A handle strap 98 is then clamped to the outer face of the disc 66 by the bolt 80 with the heads of rivets 100 projecting into sockets 102 in the strap to key the strap to the reel. A handle 104 then is grasped manually and the reel is rotated relative to the housing 54 to reel the cable completely thereon. The handle strap then is detached from the reel and the reel is moved to its storage position and is secured in that position by the setscrew 72.

While the vehicle 10 is shown with two wheel winches 20, it can be used with only one of the winches. In the latter case the cable 20 of that winch is threaded, as shown in broken lines, through the fairlead 26 and also through a central fairlead 112 fixed to the central portion of the vehicle, the end of the cable being tied to the anchor 24. When both winches are used, the cables 20 have the known, quick releasable connection 21 fastening the ends together.

The above-described wheel winches are compact when in storage conditions, and are easily changed between the storage and extended conditions.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a winch adapted to be secured to a vehicle wheel,
a drive member adapted to be attached to such a vehicle wheel and rotatable by the wheel,
a reel having a pair of flanges and slidable on the drive member between a retracted position adjacent the wheel and an operative position spaced relative to the vehicle outwardly from the wheel,
releasable means for locking the reel to the drive member when the reel is in its retracted position,
and releasable means for locking and keying the reel to the drive member when the reel is in its operative position.

2. In a winch for a vehicle wheel,
a tubular housing,
means for securing the tubular housing to a wheel of a vehicle in a position axially aligned with the wheel and extending laterally outwardly from the wheel,
a reel adapted to fit into said housing and slidable between a retracted position enclosed within said housing and an operative position extending axially beyond said housing,
means securing said reel to said housing against relative rotation therebetween at least when said reel is in its operative position,
and releasable means for holding the reel in its retracted position.

3. In a winch for a vehicle wheel,
a cable,
a reel having a drum portion for winding said cable thereon and also being provided with an inner flange and an outer flange,
a tubular housing having an end flange adapted to be secured to a wheel of a vehicle and serving to slidably mount said inner flange of said reel to permit said reel to be slid into said housing to a storage position and partially out of said housing to an operating position,
keying means drivingly connecting said reel to said drum when said reel is in said operating position,
and releasable means for latching said reel in its storage position.

4. The winch of claim 3 wherein said keying means includes a projection on said housing extending radially inwardly,
said inner flange of said reel having a notch in the inner face and periphery thereof adapted to move over and keyingly engage said projection.

5. The winch of claim 3 including
a locking pin,
said inner flange of said reel and said housing having bores for receiving said pin when said reel is in its operating position,
and means for holding said pin in a position extending into said bores.

6. The winch of claim 5 including
threaded socket means secured to said housing for receiving an end portion of said pin,
said end portion of said pin being threaded and adapted to be screwed into said socket means.

7. The winch of claim 6 including
second socket means mounted in said housing on the longitudinal axis of said housing for receiving said pin for storage of said pin.

8. The winch of claim 7 including
a handle adapted to be secured to the outer face of said outer flange by said pin,
said handle and said reel having interengaging means preventing rotation of said handle relative to said reel.

9. In a winch adapted to be secured to a brake drum of a vehicle by lug bolts and tapered lug nuts retaining a wheel having countersunk holes on the brake drum,
a housing having a flange provided with countersunk holes adapted to pass over said lug bolts and receive the tapered portions of said nuts and having portions fitting into said countersunk holes of said wheel,
said housing also including a cylindrical portion secured at one end thereof coaxially to said flange and having a pair of opposed projections extending radially inwardly at the other end thereof,
a reel having a drum, an outer flange at one end of said drum and an inner flange at the other end of said drum,
said inner flange being slidable in said housing and having a pair of notches adapted to receive said projections when said reel is in an operating position in which said inner flange is in said housing and the remainder of said reel extends beyond said housing,
said inner flange having a bore extending,
said housing having a hole therethrough aligned with said bore when said reel is in its operating position,
pin means adapted to extend through said hole into said bore to lock said reel in its operating position,
and manually releasable means adjacent said flange of the housing adapted to enter said bore when said reel is in a storage position enclosed in said housing.

10. The winch of claim 9 wherein said outer flange of said reel closes said housing when said reel is in its storage position.

References Cited by the Examiner
UNITED STATES PATENTS
1,381,152   6/1921   Wilson _____ 242—95

MERVIN STEIN, *Primary Examiner.*
N. L. MINTZ, *Assistant Examiner.*